United States Patent
Snell

(10) Patent No.: US 12,404,901 B2
(45) Date of Patent: *Sep. 2, 2025

(54) ACTIVE BEARING TEMPERATURE CONTROL

(71) Applicant: TYCO FIRE & SECURITY GmbH, Neuhausen am Rheinfall (CH)

(72) Inventor: Paul W. Snell, York, PA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/739,130

(22) Filed: Jun. 10, 2024

(65) Prior Publication Data
US 2024/0410427 A1 Dec. 12, 2024

Related U.S. Application Data

(63) Continuation of application No. 17/264,659, filed as application No. PCT/US2019/043921 on Jul. 29, 2019, now Pat. No. 12,006,982.
(Continued)

(51) Int. Cl.
*F16C 37/00* (2006.01)
*F04D 25/06* (2006.01)
(Continued)

(52) U.S. Cl.
CPC ........ *F16C 37/007* (2013.01); *F04D 25/0626* (2013.01); *F16C 19/525* (2013.01);
(Continued)

(58) Field of Classification Search
CPC ... F16N 7/40; F16N 7/08; F16N 29/02; F16N 2200/10; H02K 9/19; H02K 11/25; F16C 37/007
See application file for complete search history.

(56) References Cited

U.S. PATENT DOCUMENTS 5,067,454 A * 11/1991 Waddington ............ F16N 29/02
700/282
5,626,470 A * 5/1997 Gerhardt ............. F16C 32/0692
184/6.21

(Continued)

FOREIGN PATENT DOCUMENTS

CN 1379192 A 11/2002
CN 101115573 A 1/2008
(Continued)

OTHER PUBLICATIONS

International Search Report and Written Opinion for PCT Application No. PCT/US2019/043921, mailed Oct. 8, 2019, 13 pgs.
(Continued)

*Primary Examiner* — Anna M Momper
*Assistant Examiner* — Mark K Buse
(74) *Attorney, Agent, or Firm* — Fletcher Yoder, P.C.

(57) ABSTRACT

A motor assembly includes a shaft, a bearing, at least one fluid channel, a temperature sensor, a lubricant supply pump, and a controller. The bearing defines a bearing interface against which the shaft rotates. The at least one fluid channel is fluidly coupled with the bearing interface. The temperature sensor detects a temperature of the bearing. The lubricant supply pump is fluidly coupled with the at least one fluid channel to transport lubricant from a lubricant supply to the bearing interface via the at least one fluid channel. The controller receives the bearing temperature from the temperature sensor, determines a difference between the bearing temperature and a supply temperature of the lubricant, determines a lubricant flow rate based on the difference, and transmits a control signal to the lubricant supply pump to cause the lubricant supply pump to transport the lubricant to the bearing interface at the lubricant flow rate.

20 Claims, 5 Drawing Sheets

Related U.S. Application Data

(60) Provisional application No. 62/712,292, filed on Jul. 31, 2018.

(51) Int. Cl.

| | | |
|---|---|---|
| *F16C 19/52* | (2006.01) | |
| *F16N 7/08* | (2006.01) | |
| *F16N 7/40* | (2006.01) | |
| *F16N 29/02* | (2006.01) | |
| *G01K 3/08* | (2006.01) | |
| *G01K 13/02* | (2021.01) | |
| *G05D 23/00* | (2006.01) | |
| *H02K 7/08* | (2006.01) | |
| *H02K 9/19* | (2006.01) | |
| *H02K 11/25* | (2016.01) | |

(52) U.S. Cl.
CPC ............... *F16N 7/08* (2013.01); *F16N 7/40* (2013.01); *F16N 29/02* (2013.01); *G01K 3/08* (2013.01); *G01K 13/02* (2013.01); *G05D 23/00* (2013.01); *H02K 7/08* (2013.01); *H02K 9/19* (2013.01); *H02K 11/25* (2016.01); *F16C 2233/00* (2013.01); *F16C 2380/26* (2013.01); *F16N 2200/10* (2013.01); *F16N 2210/14* (2013.01); *F16N 2210/18* (2013.01); *F16N 2230/02* (2013.01); *F16N 2250/08* (2013.01); *G01K 2205/00* (2013.01); *H02K 2205/00* (2013.01)

(56) References Cited

U.S. PATENT DOCUMENTS

| | | | | |
|---|---|---|---|---|
| 10,030,672 | B2 | 7/2018 | Gilarranz et al. | |
| 12,006,982 | B2* | 6/2024 | Snell | G05D 23/00 |
| 2007/0271938 | A1 | 11/2007 | Shaffer | |
| 2008/0216576 | A1* | 9/2008 | Eckert | H02K 11/25 73/592 |
| 2013/0183138 | A1* | 7/2013 | Johnson | F03D 80/70 415/110 |
| 2016/0138650 | A1* | 5/2016 | McAuliffe | G08B 21/182 384/103 |
| 2017/0096115 | A1* | 4/2017 | Delp | F16N 39/02 |
| 2021/0003249 | A1* | 1/2021 | West | F16N 39/06 |

FOREIGN PATENT DOCUMENTS

| | | |
|---|---|---|
| CN | 103672346 A | 3/2014 |
| CN | 103840608 A | 6/2014 |
| CN | 106133292 A | 11/2016 |
| DE | 19833033 A1 | 1/1999 |
| EP | 3020637 A1 | 5/2016 |
| EP | 3287650 A1 | 2/2018 |
| GB | 2548877 A | 10/2017 |
| JP | S5554698 U | 4/1980 |
| JP | S5765495 A | 4/1982 |
| JP | H09273555 A | 10/1997 |
| JP | H1163385 A | 3/1999 |
| JP | 2002061572 A | 2/2002 |
| JP | 2008002591 A | 1/2008 |
| JP | 2015110907 A | 6/2015 |
| JP | 2018080694 A | 5/2018 |
| JP | 2018115671 A | 7/2018 |
| TW | 201424212 A | 6/2014 |
| TW | 201534825 A | 9/2015 |
| TW | 201704653 A | 2/2017 |

OTHER PUBLICATIONS

Taiwan Office Action for TW Application No. 108126790, dated Jun. 21, 2021, 5 pgs.
Huazhen Zhong, "Cooling System for Reducing Bearing Lubricating Oil Temperature of High-Speed Grinding Wheel Spindle", Journal of Huazhong University of Science and Technology (Natural Science Edition), Jan. 30, 1978, First issue, 7 pgs.
Chinese Office Action for CN Application No. 201980062692.3, dated Feb. 21, 2022, 11 pgs.
Japanese Office Action for JP Application No. 2021-505334, dated Mar. 29, 2022, 5 pgs.
Taiwan Office Action for TW Application No. 108126790, dated Apr. 14, 2022, 3 pgs.
Chinese Office Action for CN Application No. 201980062692.3, dated Aug. 23, 2022, 10 pgs.
Japanese Office Action for JP Application No. 2021-505334, dated Oct. 4, 2022, 6 pgs.
Japanese Office Action for JP Application No. 2023-201736, dated Nov. 27, 2024, 7 pages.

* cited by examiner

ACTIVE BEARING TEMPERATURE CONTROL

CROSS-REFERENCE TO RELATED APPLICATIONS

This application is a continuation of U.S. application Ser. No. 17/264,659, entitled "ACTIVE BEARING TEMPERATURE CONTROL," filed Jan. 29, 2021, which is a U.S. National Stage Application of PCT International Application No. PCT/US2019/043921, entitled "ACTIVE BEARING TEMPERATURE CONTROL," filed Jul. 29, 2019, which claims the benefit of and priority to U.S. Provisional Application No. 62/712,292, entitled "ACTIVE BEARING TEMPERATURE CONTROL," filed Jul. 31, 2018, each of which is incorporated herein by reference in its entirety for all purposes.

BACKGROUND

Buildings can include heating, ventilation, and air conditioning (HVAC) systems. HVAC systems can include a motor that drives a compressor, such as a compressor of a chiller assembly. Oil pumps can be used to lubricate the motor.

SUMMARY

One implementation of the present disclosure is a motor assembly. The motor assembly includes a shaft, a bearing, at least one fluid channel, a temperature sensor, a lubricant supply pump, and a controller. The bearing defines a bearing interface against which the shaft rotates. The at least one fluid channel is fluidly coupled with the bearing interface. The temperature sensor detects a temperature of the bearing. The lubricant supply pump is fluidly coupled with the at least one fluid channel to transport lubricant from a lubricant supply to the bearing interface via the at least one fluid channel. The controller receives the temperature of the bearing from the temperature sensor, determines a difference between the temperature of the bearing and a supply temperature of the lubricant, determines a lubricant flow rate based on the difference, and transmits a control signal to the lubricant supply pump to cause the lubricant supply pump to transport the lubricant to the bearing interface at the lubricant flow rate.

Another implementation of the present disclosure is a method of active bearing temperature control. The method includes detecting, by a temperature sensor, a temperature of a bearing, the bearing defining a bearing interface against which a shaft rotates; receiving, by a controller, the temperature of the bearing from the temperature sensor; determining, by the controller, a difference between the temperature of the bearing and a supply temperature of a lubricant of a lubricant supply, the lubricant supply fluidly coupled with a lubricant supply pump and to at least one fluid channel fluidly coupled with the bearing interface; determining, by the controller, a lubricant flow rate based on the difference; and transmitting, by the controller, a control signal to the lubricant supply pump to cause the lubricant supply pump to transport the lubricant from the lubricant supply to the bearing interface at the lubricant flow rate.

Another implementation of the present disclosure is a controller. The controller includes one or more processors and a memory device including non-transitory machine-readable instructions. When executed, the instructions cause the one or more processors to receive a temperature of a bearing from a temperature sensor, the bearing defining a bearing interface against which a shaft rotates; determine a difference between the temperature of the bearing and a supply temperature of a lubricant of a lubricant supply, the lubricant supply fluidly coupled with a lubricant supply pump and to at least one fluid channel fluidly coupled with the bearing interface; determine a lubricant flow rate based on the difference; and transmit a control signal to the lubricant supply pump to cause the lubricant supply pump to transport the lubricant from the lubricant supply to the bearing interface at the lubricant flow rate.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

The present disclosure relates generally to HVAC systems, and particularly to active bearing temperature control, such as active bearing temperature control in a bearing of a motor. Referring generally to the Figures, a motor assembly that can drive a compressor is depicted. The motor assembly can include a shaft, a bearing, at least one fluid channel, a temperature sensor, a lubricant supply pump, and a controller. The bearing defines a bearing interface against which the shaft rotates. The at least one fluid channel is fluidly coupled with the bearing interface. The temperature sensor detects a temperature of the bearing. The lubricant supply pump is fluidly coupled with the at least one fluid channel to transport lubricant from a lubricant supply to the bearing interface via the at least one fluid channel. The controller receives the temperature of the bearing from the temperature sensor, determines a difference between the temperature of the bearing and a supply temperature of the lubricant, determines a lubricant flow rate based on the difference, and transmits a control signal to the lubricant supply pump to cause the lubricant supply pump to transport the lubricant to the bearing interface at the lubricant flow rate. By controlling the lubricant flow rate based on the difference between the temperature of the bearing and the supply temperature, the present solution can ensure that the temperature of the bearing does not increase beyond desired operating conditions while reducing or eliminating the likelihood that lubricant will leak from the bearing interface into a housing of the motor assembly (as compared to existing systems, which supply oil to the bearing interface at constant flow rate).

Chiller Assembly

Figure 1:
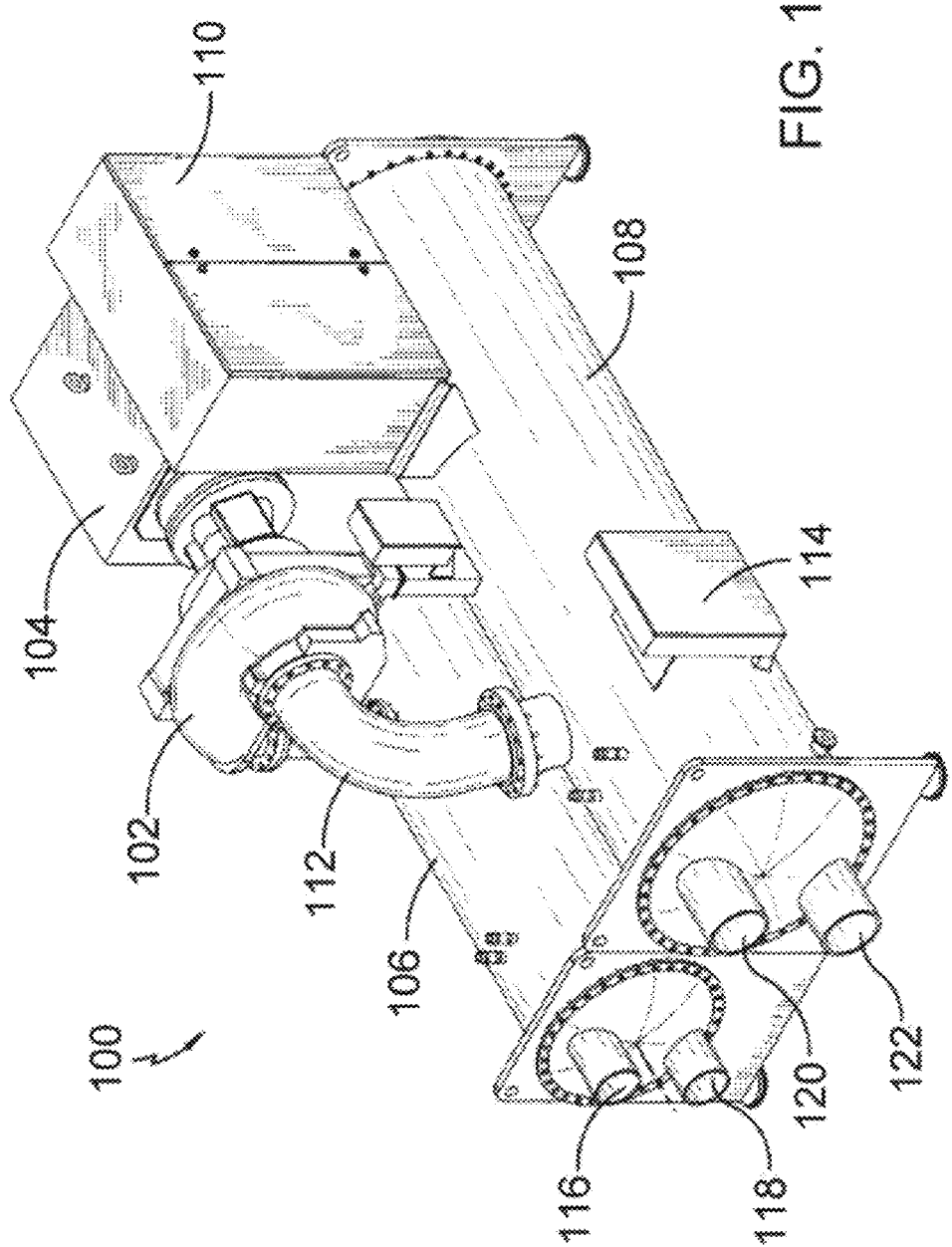
FIG. 1 is a drawing of a chiller assembly according to an embodiment of the present disclosure.

Referring to FIG. 1, a chiller assembly 100 is depicted. The chiller assembly 100 is shown to include a compressor 102 driven by a motor 104, a condenser 106, and an evaporator 108. A refrigerant is circulated through the chiller assembly 100 in a vapor compression cycle. The chiller assembly 100 can also include a control panel 114 to control operation of the vapor compression cycle within the chiller assembly 100. The control panel 114 may be connected to an electronic network in order to share a variety of data related to maintenance, analytics, etc.

The motor 104 can be powered by a variable speed drive (VSD) 110. The VSD 110 receives alternating current (AC) power having a particular fixed line voltage and fixed line frequency from an AC power source (not shown) and provides power having a variable voltage and frequency to the motor 104. The motor 104 can be any type of electric motor than can be powered by a VSD 110. For example, the motor 104 can be a high speed induction motor. The compressor 102 is driven by the motor 104 to compress a refrigerant vapor received from an evaporator 108 through a suction line 112. The compressor 102 then delivers compressed refrigerant vapor to the condenser 106 through a discharge line. The compressor 102 can be a centrifugal compressor, a screw compressor, a scroll compressor, a turbine compressor, or any other type of suitable compressor.

Refrigerant vapor delivered by the compressor 102 to the condenser 106 transfers heat to a fluid. Refrigerant vapor condenses to refrigerant liquid in the condenser 106 as a result of heat transfer with the fluid. The refrigerant liquid from the condenser 106 flows through an expansion device and is returned to the evaporator 108 to complete the refrigerant cycle of the chiller assembly 100. The condenser 106 includes a supply line 116 and a return line 118 for circulating fluid between the condenser 106 and an external component of the HVAC system (e.g., a cooling tower). Fluid supplied to the condenser 106 via a return line 118 exchanges heat with the refrigerant in the condenser 106 and is removed from the condenser 106 via the supply line 116 to complete the cycle. The fluid circulating through the condenser 106 can be water or any other suitable liquid.

Figure 2:
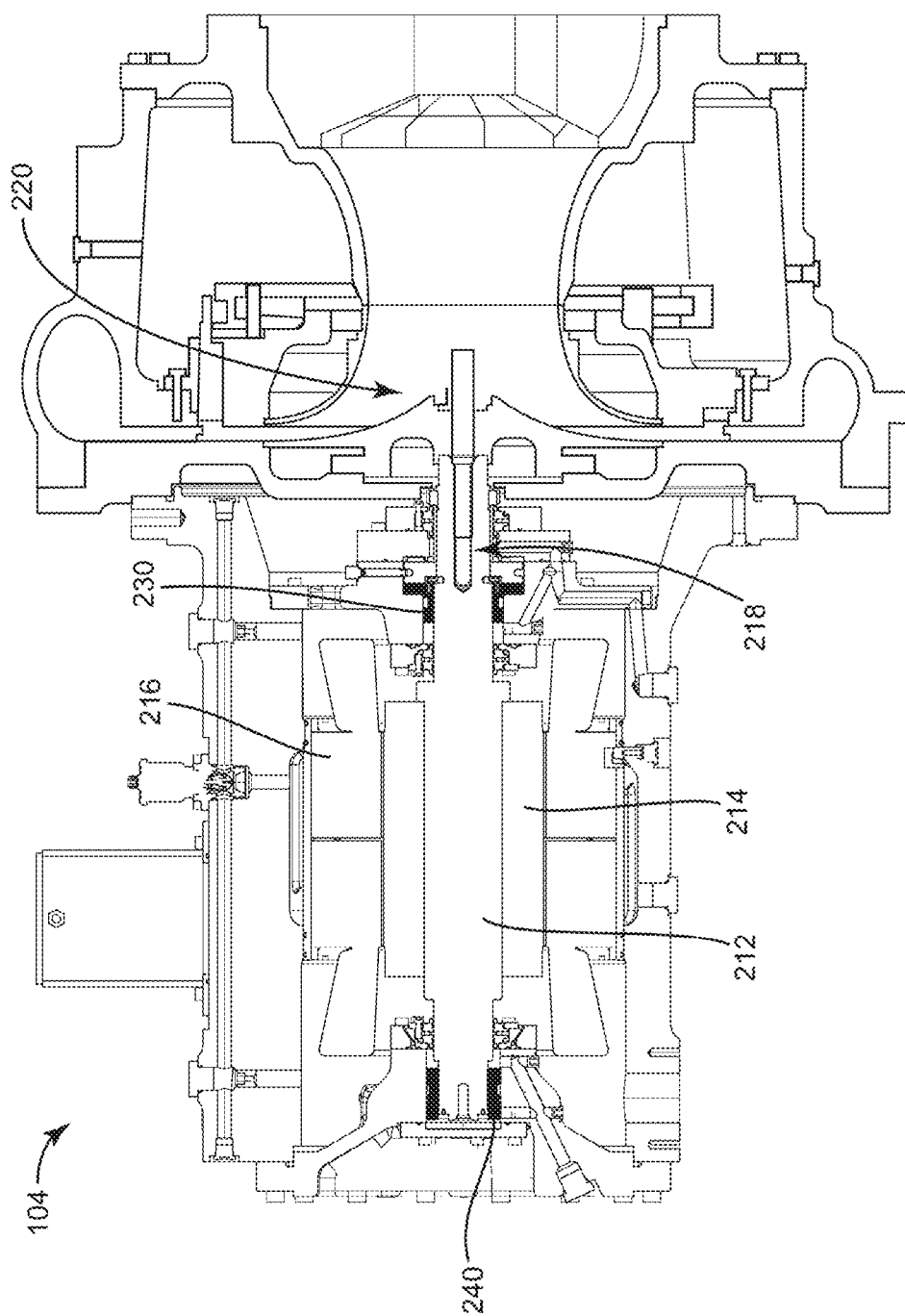
FIG. 2 is a drawing of a motor of the chiller assembly of FIG. 1.

Referring now to FIG. 2, the motor 104 is depicted in greater detail. The motor 104 can be a high speed induction motor configured to directly drive a centrifugal compressor (i.e., compressor 102). The motor 104 is shown to include a shaft 212, a rotor 214, and a stator 216. The stator 216 is supplied with AC power (e.g., from VSD 110) and includes windings that can generate a magnetic field. The magnetic field can induce an electromagnetic force that produces a torque around the axis of the rotor 214. As a result, the rotor 214 and the shaft 212 begin to rotate in a circular motion. The shaft 212 can be connected to an impeller 220 of the compressor 102 via a direct drive mechanism 218. The impeller 220 can therefore rotate at a high speed in order to raise the pressure of refrigerant vapor within the compressor 102.

The motor 104 is shown to include a first bearing 230 (e.g., pressure dam bearing) located at the drive end of motor 104 and a second bearing 240 (e.g., pressure dam bearing) located at the non-drive end of motor 104. The bearings 230 and 240 support the shaft 212 and can be lubricated with oil or another type of lubricant. As the motor 104 is energized and the shaft 212 begins to rotate, the shaft 212 may ride on a thin film of lubricant that coats the inside of the bearings 230 and 240.

Active Bearing Temperature Control of HVAC Motor Bearings

Figure 3:
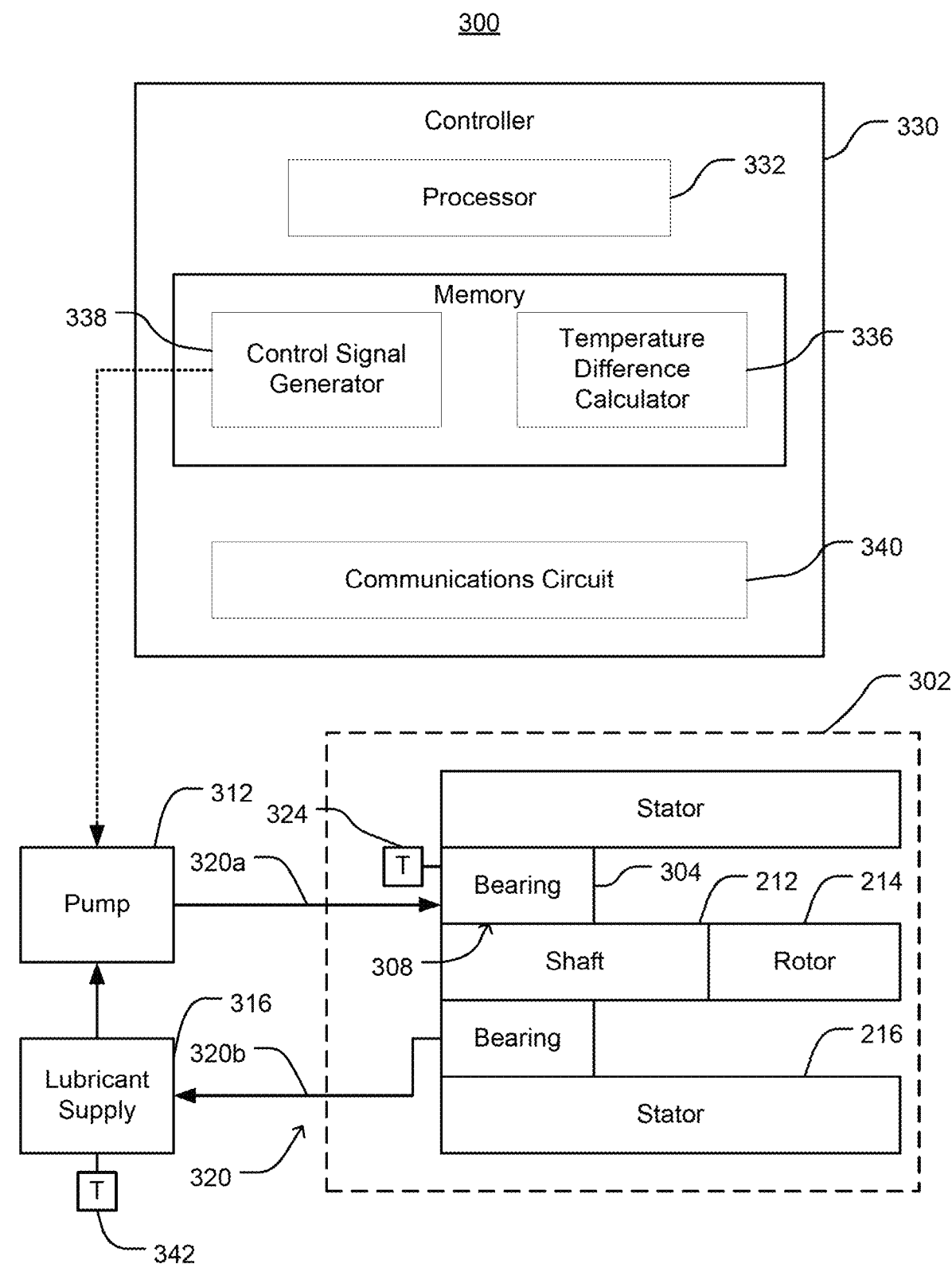
FIG. 3 is a block diagram of a motor assembly that can perform active bearing temperature control according to an embodiment of the present disclosure.
Figure 4:
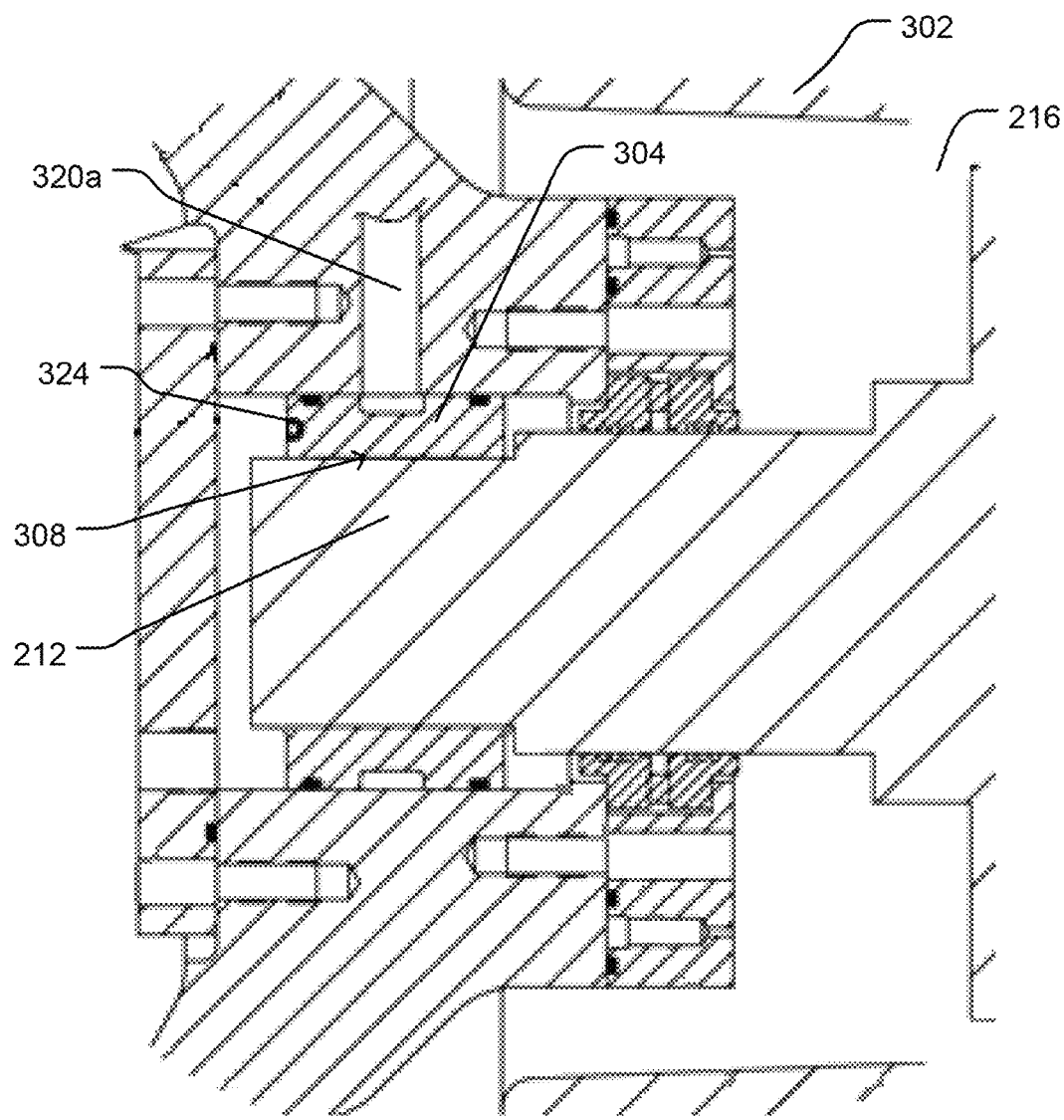
FIG. 4 is a section view drawing of the motor assembly of FIG. 3.

Referring now to FIGS. 3-4, a motor assembly 300 that provides lubricant to a bearing of a motor is depicted. The motor assembly 300 can incorporate features of the chiller assembly 100; for example, the motor assembly 300 can include the motor 104 and can be used to provide the lubricant to bearing 230 (and/or bearing 240) of the motor 104 to facilitate rotation of the shaft 212 relative to the stator 216. The lubricant can include a fluid, such as an oil.

The motor assembly 300 includes a bearing 304. The bearing 304 can be used to implement one or both of the bearings 230, 240 described with reference to FIG. 2. The bearing 304 is positioned between the shaft 212 and the stator 216. The bearing 304 defines a bearing interface 308 on an inner surface of the bearing 304. The shaft 212 can rotate against the bearing interface 308. For example, the shaft 212 can rotate on a film of lubricant on the bearing interface 308. As the shaft 212 rotates against the bearing interface 308, heat may be generated that is transferred into the bearing 304 (and other components proximate to the bearing interface 308). For example, friction between the shaft 212 and the bearing 304 can generate heat that is transferred into the bearing 304.

In some embodiments, as a speed of rotation of the shaft 212 increases (or decreases), a temperature of the bearing will increase (or decrease), such as due to an increased (or decreased) rate of friction generation and thus heat transfer into the bearing 304 via bearing interface 308.

In some embodiments, a lubricant supply pump 312 transports lubricant from a lubricant supply 316 to the bearing 304 (and the bearing interface 308) via at least one fluid channel 320. The at least one fluid channel 320 is fluidly coupled with the bearing interface 308. The at least one fluid channel 320 can include a first channel 316a that receives lubricant from the lubricant supply 316 to provide to the bearing 304, and a second channel 320b that receives lubricant from the bearing 304 to transport away from the bearing 304; for example, as depicted, the second channel 316b can transport lubricant from the bearing 304 to the lubricant supply 316.

The lubricant supply pump 312 can include a variable speed pump. For example, the lubricant supply pump 312 can receive a control signal indicative of a speed of operation of the lubricant supply pump 312, and modulate operation to achieve the indicated speed, such as to transport lubricant at a flow rate corresponding to the indicated speed.

By transporting lubricant to and from the bearing interface 308, the lubricant supply pump 312 can reduce the rate of friction-based heat generation between the shaft 212 and the bearing 304 by at least one of (1) reducing friction between the shaft 212 and the bearing interface 308 and (2) transporting heat away from the bearing interface 308 due to the flow of the lubricant away from the bearing interface 308. At the same time, the bearing interface 308 may be fluidly coupled with an interior of the motor assembly 300. For example, lubricant may leak from the bearing interface 308 into a housing 302 of the motor assembly 300. The effectiveness of operation of motor assembly 300 and/or chiller assembly 100 may be reduced due to lubricant leaking into and collecting in undesired locations in the housing 302. As discussed further herein, operation of the lubricant supply pump 312 can be modulated to reduce the rate of friction-based heat generation to maintain a target temperature rise of the bearing 304, while reducing or eliminating the likelihood lubricant leak into the housing 302.

The motor assembly 300 includes a temperature sensor 324. The temperature sensor 324 can be mounted to the bearing 304 (e.g., to a surface of the bearing 304; within the bearing 304). The temperature sensor 324 can detect a temperature of the bearing 304. In some embodiments, the temperature sensor 324 includes at least one of a thermocouple, a resistance thermometer, and a negative temperature coefficient thermistor. The motor assembly 300 can include a plurality of temperature sensors 324 disposed at various locations of motor assembly 300, including at a plurality of bearings 304 and/or multiple locations of one or more bearings 304.

The motor assembly 300 includes a controller 330. The controller 330 includes a processor 332 and memory 334. Processor 332 can be a general purpose or specific purpose processor, an application specific integrated circuit (ASIC), one or more field programmable gate arrays (FPGAs), a group of processing components, or other suitable processing components. Processor 332 is configured to execute computer code or instructions stored in memory 334 or received from other computer readable media (e.g., CDROM, network storage, a remote server, etc.).

Memory 334 can include one or more devices (e.g., memory units, memory devices, storage devices, etc.) for storing data and/or computer code for completing and/or facilitating the various processes described in the present disclosure. Memory 334 can include random access memory (RAM), read-only memory (ROM), hard drive storage, temporary storage, non-volatile memory, flash memory, optical memory, or any other suitable memory for storing software objects and/or computer instructions. Memory 334 can include database components, object code components, script components, or any other type of information structure for supporting the various activities and information structures described in the present disclosure. Memory 334 can be communicably connected to processor 332 via controller 330 and may include computer code for executing (e.g., by processor 332) one or more processes described herein. When processor 332 executes instructions stored in memory 334, processor 332 generally configures the controller 330 to complete such activities.

The controller 330 includes a communications circuit 340. The communications circuit 340 can include wired or wireless interfaces (e.g., jacks, antennas, transmitters, receivers, transceivers, wire terminals, etc.) for conducting data communications with various systems, devices, or networks. For example, the communications circuit 340 can include an Ethernet card and port for sending and receiving data via an Ethernet-based communications network. As another example, the communications circuit 340 can include a WiFi transceiver for communicating via a wireless communications network. The communications circuit 340 can communicate via local area networks (e.g., a building LAN), wide area networks (e.g., the Internet, a cellular network, etc.), and/or conduct direct communications (e.g., NFC, Bluetooth, etc.). In various embodiments, the communications circuit 340 can conduct wired and/or wireless communications. For example, the communications circuit 340 can include one or more wireless transceivers (e.g., a Wi-Fi transceiver, a Bluetooth transceiver, a NFC transceiver, a cellular transceiver, etc.). The communications circuit 340 can be coupled with the temperature sensor 324 to receive the temperature of the bearing 304 from the temperature sensor 324.

Memory 334 is depicted to include a temperature difference calculator 336. Temperature difference calculator 336 calculates a difference between the temperature of the bearing 304 received from the temperature sensor 324 and a supply temperature of the lubricant. Temperature difference calculator 336 can store the supply temperature of the lubricant as a predetermined value. Temperature difference calculator 336 can receive the supply temperature of the lubricant from a temperature sensor 342 that can detect the supply temperature of the lubricant. The temperature sensor 342 can be similar to the temperature sensor 324. The temperature sensor 324 can be coupled with the lubricant supply (e.g., disposed within a housing thereof) or otherwise positioned to detect a temperature of the lubricant before the temperature of the lubricant increases due to the heat generated by interaction of the shaft 212 and the bearing 304.

Memory 334 is depicted to include a control signal generator 338. The control signal generator 338 can generate a control signal based on the difference between the temperature of the bearing 304 and the supply temperature of the lubricant. The control signal generator 338 can transmit the control signal to the lubricant supply pump 312 to control operation of the lubricant supply pump 312. For example, the control signal generator 338 can transmit the control signal to cause the lubricant supply pump 312 to operate at a target speed.

In some embodiments, the control signal generator 338 generates the control signal based on a threshold temperature difference. The threshold temperature difference may be indicative of a maximum amount by which the temperature of the bearing 304 should be allowed to increase to relative to the supply temperature of the lubricant. The threshold temperature difference may be indicative of a maximum temperature at which the bearing 304 should be allowed to operate.

In some embodiments, the control signal generator 338 determines the lubricant flow rate to maintain the difference between the temperature of the bearing 304 and the supply temperature of the lubricant at or below the threshold temperature difference. For example, if the difference is greater than (or greater than or equal to) the threshold temperature difference, the control signal generator 338 can increase the lubricant flow rate; if the difference is less than or equal to (or less than) the threshold temperature difference, the control signal generator 338 can decrease the lubricant flow rate. The control signal generator 338 can include a control function that when executed, converts at least one of (1) the temperature of the bearing 304 and (2) the difference between the temperature of the bearing 304 and the supply temperature of the lubricant to a corresponding value of the lubricant flow rate. In some embodiments, the control signal generator 338 implements the control function using a lookup table or other data structure mapping the at least one of (1) the temperature of the bearing 304 and (2) the difference between the temperature of the bearing 304 and the supply temperature of the lubricant to the corresponding value of the lubricant flow rate.

The control signal generator 338 can generate and transmit a control signal to the lubricant supply pump 312 to cause the lubricant supply pump 312 to transport the lubricant from the lubricant supply 316 to the bearing 304 (e.g., to the bearing interface 308) at the determined lubricant flow rate. For example, the control signal generator 338 can set at least one of a current, a voltage, or a power of the control signal at a value that causes the lubricant supply pump 312 to transport the lubricant at the determined lubricant flow rate. By modulating operation of the lubricant supply pump 312 based on the difference between the temperature of the bearing 304 and the supply temperature of the lubricant, the control signal generator 338 can help ensure that the temperature of the bearing 304 does not increase beyond desired operating conditions while reducing or eliminating the likelihood that lubricant will leak from the bearing interface 308 into the motor housing 302.

Figure 5:
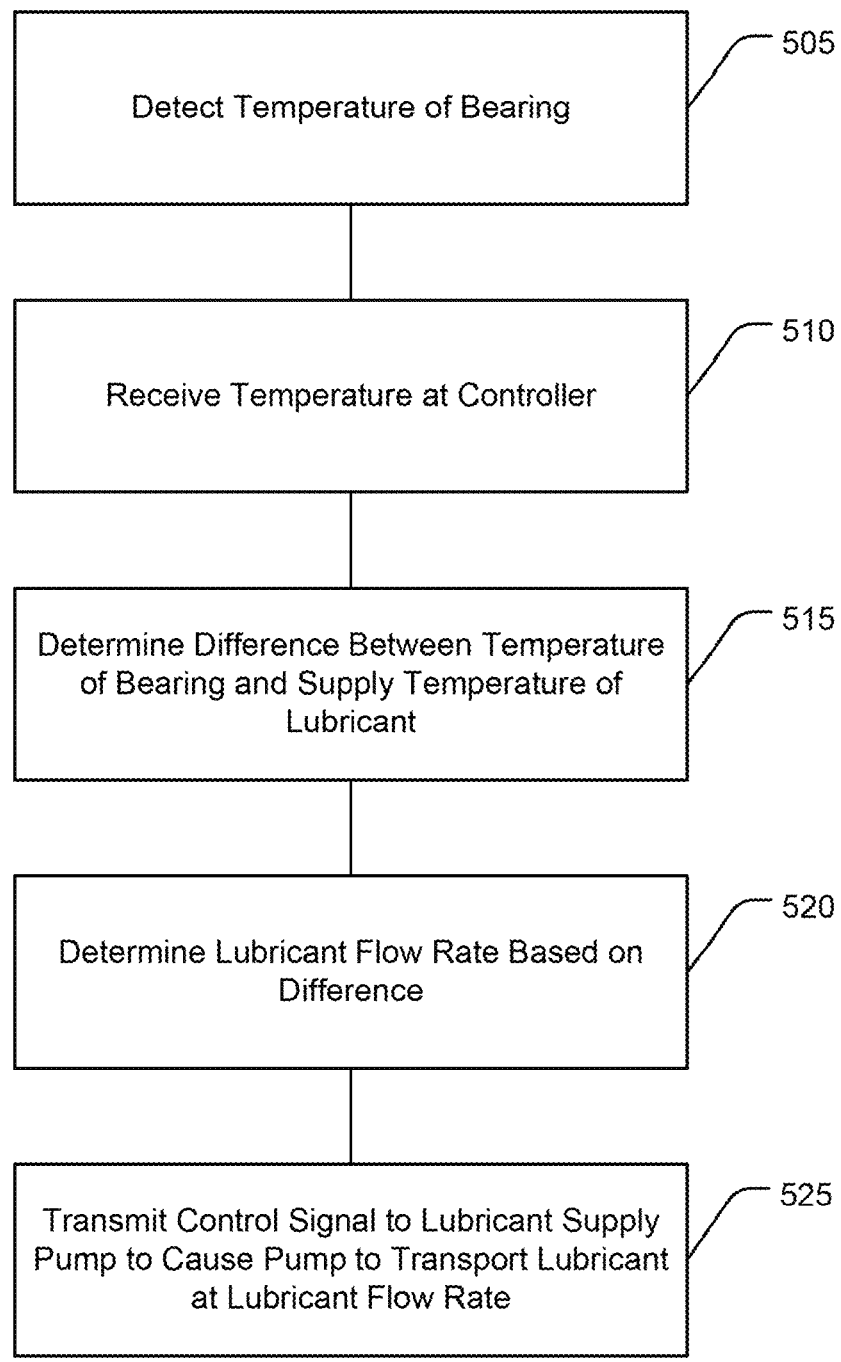
FIG. 5 is a flow diagram of a method of active temperature bearing control according to an embodiment of the present disclosure.

Referring now to FIG. 5, among others, a method 500 of active bearing temperature control is depicted. The method 500 can be performed using the motor assembly 300.

At 505, a temperature of a bearing is detected by a temperature sensor. The bearing defines a bearing interface against which a shaft rotates. The temperature sensor can be mounted to the bearing. The temperature sensor can include at least one of a thermocouple, a resistance thermometer, and a negative temperature coefficient thermistor. The bearing can enable the shaft to rotate relative to a stator, such as a stator which outputs a magnetic field to cause a rotor coupled with the shaft to rotate.

At 510, the temperature of the bearing is received by a controller. The controller can include a communications circuit that receives the temperature of the bearing wirelessly or by a wired connection.

At 515, the controller determines a difference between the temperature of the bearing and a supply temperature of a lubricant of a lubricant supply. The lubricant supply is fluidly coupled with a lubricant supply pump and to at least one fluid channel fluidly coupled with the bearing interface. The controller can at least one of store the supply temperature of the lubricant as a predetermined value and receive the supply temperature of the lubricant from a temperature sensor coupled with the lubricant supply or otherwise positioned to detect the supply temperature of the lubricant. The lubricant supply pump can include a variable speed pump.

At 520, the controller determines a lubricant flow rate based on the difference. The controller can determine the lubricant flow rate to maintain the difference at or below a threshold temperature difference. The threshold temperature difference may be representative of a threshold above which a temperature of the bearing is undesirable for operation of a chiller assembly including the bearing. If the difference indicates that the temperature of the bearing is greater than (or greater than or equal to) the threshold temperature difference, the controller can increase the lubricant flow rate. If the difference indicates that the temperature of the bearing is less than or equal to (or less than) the threshold temperature difference, the controller can decrease the lubricant flow rate.

At 525, the controller transmits a control signal to the lubricant supply pump to cause the lubricant supply pump to transport the lubricant from the lubricant supply to the bearing interface at the lubricant flow rate. The controller can generate the control signal to modulate a speed of operation of the lubricant supply pump, such as by identifying a target speed of operation corresponding to the determined lubricant flow rate and setting at least one of a current, a voltage, and a power of the control signal to indicate the target speed. The controller can generate the control signal to decrease the lubricant flow rate based on the difference being greater than a threshold temperature difference.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The construction and arrangement of the systems and methods as shown in the various exemplary embodiments are illustrative only. Although only example embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A motor assembly, comprising:
   a shaft configured to couple to a compressor of a heating, ventilation, and air conditioning (HVAC) system;
   a bearing configured to support the shaft;
   a variable speed pump configured to transport lubricant to the bearing via at least one fluid channel; and a controller configured to:
  receive sensor feedback indicative of a temperature of the bearing;
  determine a difference between the temperature of the bearing and a supply temperature of the lubricant; and
  modulate operation of the variable speed pump based on the difference.

2. The motor assembly of claim 1, wherein the shaft is configured to rotate against an inner surface of the bearing.

3. The motor assembly of claim 1, wherein the controller is configured to receive the sensor feedback indicative of the temperature of the bearing from at least one of a thermocouple, a resistance thermometer, or a negative coefficient thermistor.

4. The motor assembly of claim 1, wherein the controller is configured to modulate operation of the variable speed pump based on the difference and a threshold value.

5. The motor assembly of claim 4, wherein the controller is configured to modulate operation of the variable speed pump to increase a flow rate of the lubricant supplied to the bearing in response to a determination that the difference is greater than the threshold value.

6. The motor assembly of claim 4, wherein the controller is configured to modulate operation of the variable speed pump to decrease a flow rate of the lubricant supplied to the bearing in response to a determination that the difference is less than the threshold value.

7. The motor assembly of claim 4, wherein the threshold value is indicative of a maximum allowable increase of the temperature of the bearing relative to the supply temperature of the lubricant.

8. The motor assembly of claim 1, wherein the controller is configured to adjust at least one of a current, a voltage, or a power applied to the variable speed pump to adjust a speed of the variable speed pump.

9. A heating, ventilation, and air conditioning (HVAC) system, comprising:
  a compressor; and
  a motor assembly configured to drive the compressor, wherein the motor assembly comprises:
    a shaft;
    a bearing defining a bearing interface, wherein the shaft is configured to rotate against the bearing interface;
    a sensor configured to detect a temperature of the bearing;
    a fluid channel fluidly coupled to the bearing interface;
    a variable speed pump configured to transport a lubricant from a lubricant supply to the bearing interface via the fluid channel; and
    a controller configured to:
      determine a difference between the temperature of the bearing and a supply temperature of the lubricant based on sensor feedback from the sensor; and
      modulate operation of the variable speed pump based on the difference.

10. The HVAC system of claim 9, wherein the controller is configured to modulate operation of the variable speed pump based on the difference and a threshold value.

11. The HVAC system of claim 10, wherein the threshold value is indicative of a maximum allowable increase of the temperature of the bearing relative to the supply temperature of the lubricant.

12. The HVAC system of claim 10, wherein the controller is configured to modulate operation of the variable speed pump to increase a flow rate of the lubricant supplied to the bearing interface based on a determination that the difference is greater than the threshold value.

13. The HVAC system of claim 10, wherein the controller is configured to modulate operation of the variable speed pump to decrease a flow rate of the lubricant supplied to the bearing interface based on a determination that the difference is less than the threshold value.

14. The HVAC system of claim 9, wherein the sensor is mounted to the bearing.

15. The HVAC system of claim 9, wherein the sensor comprises at least one of a thermocouple, a resistance thermometer, or a negative temperature coefficient thermistor.

16. A controller configured to control operation of a motor assembly of a heating, ventilation, and air conditioning (HVAC) system, wherein the controller comprises:
  a processor; and
  a memory comprising executable code stored thereon, wherein the executable code, when executed by the processor, causes the controller to:
    receive sensor feedback indicative of a temperature of a bearing, wherein the bearing is configured to support a shaft of the motor assembly, and the shaft is configured to couple to a compressor of the HVAC system;
    determine a difference between the temperature of the bearing and a supply temperature of a lubricant; and
    modulate operation of a variable speed pump based on the difference, wherein the variable speed pump is configured to transport the lubricant to the bearing via at least one fluid channel.

17. The controller of claim 16, wherein the executable code, when executed by the processor, causes the controller to modulate operation of the variable speed pump based on the difference and a threshold value.

18. The controller of claim 17, wherein the threshold value is indicative of a maximum allowable increase of the temperature of the bearing relative to the supply temperature of the lubricant.

19. The controller of claim 17, wherein the executable code, when executed by the processor, causes the controller to adjust a speed of the variable speed pump to increase a flow rate of the lubricant supplied to the bearing based on the difference being greater than the threshold value.

20. The controller of claim 17, wherein the executable code, when executed by the processor, causes the controller to adjust a speed of the variable speed pump to decrease a flow rate of the lubricant supplied to the bearing based on the difference being less than the threshold value.

* * * * *